United States Patent [19]

Towle

[11] 3,951,943
[45] Apr. 20, 1976

[54] COUPLING PROCESS IN THE PREPARATION OF DISAZO DIIMIDES

[75] Inventor: Jack L. Towle, Holland, Mich.

[73] Assignee: Chemetron Corporation, Chicago, Ill.

[22] Filed: Mar. 18, 1974

[21] Appl. No.: 451,873

[52] U.S. Cl. .............................. 260/176; 260/152; 260/140 P
[51] Int. Cl.² ...................................... C09B 41/00
[58] Field of Search ........................... 260/152, 176

[56] References Cited
UNITED STATES PATENTS

| | | |
|---|---|---|
| 3,382,228 | 5/1968 | Ferrari et al. ...................... 260/158 |
| 3,502,643 | 3/1970 | Horstmann et al. ................ 260/152 |
| 3,513,153 | 5/1970 | Horstmann et al. ................ 260/152 |
| 3,526,618 | 9/1970 | Horstmann et al. ................ 260/152 |

*Primary Examiner*—Floyd D. Higel
*Attorney, Agent, or Firm*—N. M. Esser

[57] ABSTRACT

The coupling of a bis-acetoacetylamino compound and a diazotized aminophthalic acid proceeds rapidly to the disazo stage in an aqueous solution of a cyclic ether such as tetrahydrofuran at about room temperature or below, e.g., from about 10°C. to about 25°C., to form the disazo tetracarboxylic acid in very high yields. The corresponding diimide is formed by reacting the tetracarboxylic acid with two molecular proportions of ammonia or a primary amine.

10 Claims, No Drawings

COUPLING PROCESS IN THE PREPARATION OF DISAZO DIIMIDES

THE INVENTION

This invention relates to compounds which can be represented by the general formula:

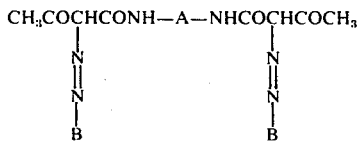

wherein A is an aryl or substituted aryl group such as a phenylene, polyphenylene or a condensed ring group and B is a phthalic acid, anhydride, or imide radical having the respective formulae:

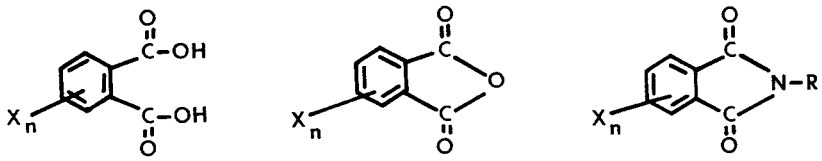

wherein the X radicals are the same or different halogen, lower alkyl or lower alkoxy radicals, $n$ is an integer from 0 to 2 and R is hydrogen, cycloloweralkyl, hydroxyloweralkyl, phenyl, substituted phenyl, naphthyl and lower aliphatic groups such as lower alkyl and lower alkenyl.

The invention particularly relates to a process for preparing these compounds and more particularly to the step of coupling a bisacetoacetylamino compound with a diazotized aminophthalic acid.

Compounds represented by the general formula above are taught in U.S. Pat. No. 3,256,618. It is also taught therein that the coupling of one mole of a diazotized aminophthalic acid with an N,N'-arylene-bis-acetoacetyl amide leads to a monoazo dyestuff which is readily soluble in an alkaline medium so that reaction with another mole of diazotized aminophthalic acid can easily be performed to obtain a disazo tetracarboxylic acid.

The coupling procedure taught in the patent is not satisfactory, however, for attaining complete conversion to the disazo tetracarboxylic acid, especially when A in Formula I is a halogenated aryl group. In some instances the monoazo diacid constitutes as much as 60 mole percent of the final product when an aqueous ethanol coupling medium is employed as taught in the working examples of the patent. The tinctorial strength and clarity of a colorant consisting of a substantially pure disazo tetra-acid and of colorants derived therefrom are significantly greater than of those containing a mixture of monoazo and disazo compounds.

Now it has been discovered that a substantially quantitative conversion to the disazo tetracarboxylic acid is achieved by a coupling method employing an aqueous medium containing a cyclic ether.

It is a principal object of this invention, therefore, to provide a novel method of coupling a diazotized aminophthalic acid with an N,N'-arylene bis-acetoacetamide.

It is another object of this invention to provide an improved method of preparing a disazo tetracarboxylic acid.

It is a related object of this invention to provide an improved method of preparing a disazo diimide.

It is a further object of this invention to provide a method of preparing disazo diimide colorants having a high tinctorial strength and superior clarity.

It is yet another object of this invention to provide disazo diimide colorants having a high tinctorial strength.

These and other objects are achieved according to this invention by a method comprising the steps of coupling one molecular proportion of a bis-acetoacetamide having the formula:

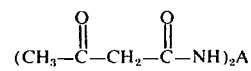

wherein A is an aromatic hydrocarbylene or substituted aromatic hydrocarbylene radical, with two molecular proportions of a diazotized aminophthalic acid having the formula:

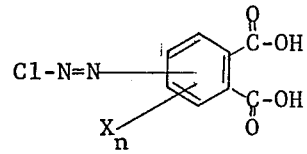

wherein the X radicals are the same or different halogen, lower alkyl or lower alkoxy radicals, and $n$ is an integer from 0 to 2, in an aqueous medium containing a sufficient amount of a water soluble cyclic ether to bring the reagents into solution, thereby producing a disazo tetracarboxylic acid, and reacting said acid with about two molecular proportions of ammonia or a primary amine. Usually, an amount of cyclic ether equal to from about 40% to about 60% of the total volume of the reaction mixture is sufficient. Preferably, a cyclic ether selected from the class consisting of tetrahydrofuran, tetrahydropyran, dioxane and mixtures thereof constitutes about half of the volume of the reaction mixture.

The coupling reaction can be advantageously effected by the addition of an aqueous suspension of two molecular proportions of the diazotized aminophthalic acid to a suspension of one molecular proportion of the bis-acetoacetamide in a 1:1 by volume mixture of water and the cyclic ether. The reaction proceeds rapidly at about room temperature or below, e.g., from about 10°C. to about 25°C. and subsequent to acidification to a pH of about 1 to 2, filtration and drying, the disazo tetracarboxylic acid is obtained in very high yields.

equal volumes of water and tetrahydrofuran. The tinctorial strength of the product after the second coupling reaction was much improved and approximately equal to that of the disazo tetracarboxylic acid obtained in one step by the method of this invention.

In an attempt to increase the conversion to the tetra-acid and, thereby, the yield of product, an excess (3 mls.) of diazo phthalic acid was mixed with one mole of chine down time is obtained, since reduced pressure is developed at the cutting edge.

Another advantage is the cleaner, straighter cuts that are accomplished by the present invention. Additionally, the notched compound cutting edge configuration is relatively simple to form and can be done, for example, by grinding. As previously discussed, another advantage afforded by the present invention is longevity of the back up cutting die pad.

Other advantages are particular to the individual stock material being cut. For example, in cutting fiber glass it has been found that approximately eighty percent less dust is generated during cutting. Fibers in vinyl and other fiber materials are not fused together, because of less heat generated during the cutting action, resulting from cleaner cutting while the reduced pressure is exerted on the cutting tool.

Cutting cylindrical holes in foam with prior art cutting instruments generally results in a concave-shaped cut along the thickness of the stock material. This is due to the cutting instrument compressing the foam material before the cutting action actually begins. The present invention eliminates the concave or convex holes or end cuts and provides a straighter cut for foam materials because the piercing points initiate the cutting action and reduces the foam compression.

Other advantages and meritorious features of this invention will more fully appear from the following specifications, claims and accompanying drawings.

BRIEF DESCRIPTION OF THE DRAWINGS

FIG. 1 is a schematic, cross-sectional view of a die press which includes a cutting tool having the cutting edge configuration of the present invention;

FIG. 2 is a perspective view of the cutting tool of FIG. 1;

FIG. 3 is a schematic, partially cross-sectional view of another die press and cutting tool in combination with a punch tool;

FIG. 4 is a perspective view of the cutting tool in FIG. 3;

FIGS. 5–10 are perspective views of various cutting tools which may include the cutting configuration of the present invention;

FIG. 11 is an enlarged, fragmented plan view of one embodiment of the cutting edge configuration;

FIG. 12 is an enlarged, fragmented side elevational view of the cutting edge configuration of FIG. 11;

FIG. 13 is a cross-sectional view taken along plane 13—13 of FIG. 12.

DETAILED DESCRIPTION OF THE INVENTION

Referring now to the drawings, FIG. 1 illustrates a cutting press 10 which is primarily suited for use in cutting thick or tough materials, such as soft metallic materials. The die press 10 includes a fixed die base 12 surmounted by and connected to mounting plate 14 in a conventional manner. A male punch 16 and a resilient stripper pad 18 is suitably mounted on top of mounting plate 14 for receiving stock material 20. The stock material is cut with a flat die rule 22 which is shown in perspective in FIG. 2. The cutting edge of die rule 22 includes a plurality of side-by-side notched configurations 23 which form a novel cutting edge that will be more fully explained below.

Die rule 22 is mounted in a die rule mounting block 24, which is illustrated as being a wood block. Mounting block 24 is suitably mounted to a back up plate 26 which is connected to a punch holder 28. A compressible stripper pad 30 is also attached to mounting block 24 in conventional manner and comprises, for example, hard rubber as is somewhat conventional in the art. The die rule 22, stripper pad 30, mounting block 24, back up plate 26, and punch holder 28 comprise a vertically reciprocal cutting die.

Operation of the embodiment of FIG. 1 includes raising the cutting die so that a piece of stock material 20 may be properly positioned on male punch 16 and stripper pad 18. The cutter die is then driven under pressure downwardly so that the die blade 22 severs the stock material to form a blank of predesired configuration, thereby leaving scrap material 33. As illustrated, die rule blade 22 cuts through the stock material and barely extends into a slot 32 defined between punch 16 and stripper pad 18. Downward movement of the die press is limited substantially to the position shown in FIG. 1, so that the cutting edge on rule 23 does not strike mounting plate 14. As the die rule blade 22 projects into slot 32, the stripper pad 30 is compressed. Then as the die press is raised, stripper pad 30 expands and leaves the cut stock material on punch 16.

FIG. 3 illustrates a die press primarily suited for cutting soft stock material. This embodiment includes a fixed base 42 and a vertically reciprocable punch holder 44 to which back up plate 46, mounting block 48, and die rule blade 50 are mounted. In this particular embodiment, the die rule blade is cylindrical as shown in FIG. 4 and includes a plurality of side-by-side notches 52 in accordance with the present invention. Also in this embodiment, a punch 54 is suitably mounted in mounting block 48, and may include the cutting edge configuration of this invention.

In operation of the embodiment in FIG. 3, the punch holder 44 is raised from the position illustrated and a piece of stock material 56 is properly positioned on a resilient die pad 58. Die pad 58 is suitably mounted on the fixed base 42 and is comprised of a rubber or polyurethane material. Scrap material is formed during the cutting operation by punch 54, the scrap being removed through a knock-out hole 60 in punch 54, as is conventional.

After the stock material is properly positioned on the die pad, punch 54 is moved under pressure by suitable power means, such as a hydraulic cylinder and piston, to drive the die rule cutting blade through the stock material 56. At about the same time, punch 54 forms a scrap slug.

As shown in FIG. 3, the die rule cutting edge barely cuts into the die pad. This is necessary so that the notched configuration of the cutting edge in the present invention will completely cut through the stock material. However, in later portions of this disclosure, it will be explained that the present invention limits the extent to which the die rule cuts into the die pad, thereby yielding one of the advantages of the present invention; i.e., greater die pad longevity, with very little resurfacing required.

From the embodiments shown in FIGS. 1 and 3, it can be readily seen that the cutting edge configuration of this invention can be used in a variety of ways. FIGS. 5–10 further illustrate that the cutting edge configuration is not limited to a die rule, per se, but is virtually unlimited in its application. For example, FIG. 5 illustrates a circular hole saw 70 having a shaft 71 and being conventional in every respect except the novel cutting edge configuration 72 of the present invention.

gms. of N,N'-(3,3'-dimethylbiphenylene)-bis acetoacetamide, and 30.0 gms. of sodium acetate. The pH of this suspension is adjusted to 5.8 with acetic acid, then placed in a 3 liter beaker equipped with an Eppenbach agitator. Provision is made for introducing the diazotized 3-aminophthalic acid directly under the agitator.

Six hundred mls. of tetrahydrofuran are added to the coupler suspension, the agitator started at medium speed, and the diazonium compound slurry run in at a rate which will keep a very slight excess of the diazonium compound (testing by coupling with R-Salt solution). At the same time tetrahydrofuran is added to maintain a concentration of this solvent at approximately 50%. A brilliant yellow product is formed.

The coupling is complete at room temperature in about 10 minutes, and the slurry is agitated for 15 minutes longer. Sufficient hydrochloric acid is added to liberate the tetracarboxylic acid which is separated by filtration and washed. After drying, a yield of 36.6 gms. is obtained, equivalent to 96.1% of theoretical. The melting point is above 370°C. The infrared absorbencies of the product are as follows: $\lambda$ max. KBr ($\mu$) 2.94 (acid OH); 3.30 (amide NH); 5.74 (acid C=O); 6.61, 6.71 (N=N).

The products of the coupling processes described in the above examples are used in the following examples to illustrate further the steps of the improved method of preparing a disazo diimide.

EXAMPLE 3

A.

N,N'-(2,5-dichloro-p-phenylene)-bis[2-(2,3-dicarboxyphenylazo)-acetoacetamide]dianhydride To a one liter flask equipped with stirrer, thermometer, reflux condenser and drying tube are added 30 gms. (0.041 mole) of the disazo compound prepared in Example 1, 500 mls. of monochlorobenzene, and 16 gms. (0.156 mole) of acetic anhydride. The mixture is heated to reflux and maintained at this temperature for 24 hours, cooled to room temperature, filtered, and washed with 500 mls. of monochlorobenzene. After drying in a vacuum oven, 26.3 gms. are obtained representing 89% of theory. Chlorine analysis is as shown: Calculated: $C_{30}H_{18}O_{10}N_6Cl_2$; Cl, 10.25. Found: Cl, 10.55. Infrared absorbencies of the product are as follows: $\lambda$ max. KBr ($\mu$) 3.26 (amide NH); 5.40 (anhydride C—O—C); 5.63, 5.95 (C=O); 6.60, 6.70 (N=N).

B.

N,N'-(2,5-dichloro-p-phenylene)-bis{2-[N-(p-chlorophenyl)-2,3-dicarboximidophenylazo]-acetoacetamide}

To a one liter flask equipped with stirrer, thermometer, reflux condenser and drying tube are added 10 gms. (0.014 mole) of the yellow dianhydride, 7 gms. (0.054 mole) of p-chloroaniline, 50 mls. of trichlorobenzene and 50 mls. of glacial acetic acid. The mixture is refluxed for about 24 hours or until a small sample, filtered and washed with ethanol, produces little or no bleed in boiling 3% aqueous sodium hydroxide. When the reaction is complete the product is filtered, washed with 500 mls. of ethanol and dried in a vacuum oven at 90°C. The product is then extracted with boiling 3% aqueous sodium hydroxide, filtered, washed neutral with water, and then dried at 70°C. The pigment is obtained in almost quantitative yield.

The bright yellow diimide pigment of this example is stable to about 390°C., has good lightfastness and is non-bleeding in solvents such as o-dichlorobenzene, acetone, xylene, and perchloroethylene at their boiling temperatures. Elemental analysis is as shown: Calculated: $C_{42}H_{22}O_8N_8Cl_4$; C, 55.27; H, 2.85; N, 12.28; Cl, 15.57. Found: C, 55.33; H, 3.35; N, 12.09; Cl, 15.40. Infrared absorbencies of the product are as follows: $\lambda$max. KBr ($\mu$) 3.35 (amide NH); 5.62 (imide C—N—C); 5.81, 5.96 (C=O); 6.60, 6.73 (N=N).

EXAMPLE 4

A.

N,N'-(3,3'-dimethylbiphenylene)-bis[2-(2,3-dicarboxyphenylazo)-acetoacetamide]dianhydride To a one liter flask are added 300 mls. of monochlorobenzene, and 15.28 gms. (0.02 mole) of the tetracarboxylic acid of Example 2. Water is removed by azeotropic distillation. Acetic anhydride (100 mls.) is added and the contents of the flask are heated at reflux (129°C.) for 15.5 hours. After filtering, washing with monochlorobenzene, and drying in a vacuum oven, a yield of 13.80 gms. of a brilliant yellow solid is obtained, equivalent to 94.8% of theoretical. The melting point is 362°C. (dec.) The infrared absorbencies of the product are as follows: $\lambda$max. KBr ($\mu$) 3.12 (amide NH); 5.40 (anhydride C—O—C); 5.63, 5.95 (C=O); 6.60, 6.70 (N=N).

B.

N,N'-(3,3'-dimethylbiphenylene)-bis[2-(2,3-dicarboximidophenylazo)-acetoacetamide]

To 250 mls. of anhydrous o-dichlorobenzene are added 7.28 gms. (0.01 mole) of the dianhydride, and 5.0 gms. of urea. The mixture is heated at 165°C. for four hours when a test of a small sample shows no solubility in boiling 3% sodium hydroxide. The yellow pigment is filtered off, washed with acetone and dried in a vacuum oven. A yield of 8.0 gms. is obtained. The melting point is above 370°C. The pigment shows no bleed when heated in the following solvents at their boiling temperatures: 3% sodium hydroxide, o-dichlorobenzene, perclene, xylene, acetone and methylethyl ketone. Infrared absorbencies are as follows: $\lambda$max. KBr ($\mu$) 3.14 (amide NH); 5.64 (imide C—N—C); 5.79, 5.97 (C=O); 6.60, 6.73 (N=N).

The superiority of the coupling method of this invention is shown by the following comparison with the aqueous ethanol method taught in the aforementioned patent.

The yield of an azo acid prepared by coupling a diazotized 3-aminophthalic acid with N,N'-(2,5-dichloro-p-phenylene) bis-acetoacetamide in an aqueous coupling medium containing about 5% by volume ethanol was 83.5% of the theoretical amount of the expected disazo tetracarboxylic acid and contained about 40 mole percent of the disazo tetra-acid and about 60 mole percent of the monoazo diacid. The yield of azo acid prepared from the same reactants in the coupling medium of this invention was 97% of the theoretical amount and the anhydride contained about 88.6 mole percent of the disazo product. The product of the instant invention is tinctorially stronger than that of the prior art method.

A sample of the azo acid prepared by the prior art method and weighing 19 gms. took up an additional 3.6 gms. of diazo phthalic acid when the two reactants were mixed in a coupling medium containing about the bis-acetoacetamide in the aqueous ethanol medium of the prior art. There was no increase in yield over that obtained when the stoichiometric 2 mls. of diazo phthalic acid was used and no improvement in tinctorial strength was noted.

The embodiments of the invention illustrated and described herein are merely illustrative and variations which may differ in detail but not in substance will readily suggest themselves to those skilled in the art of making and using pigments. The scope of the invention is not intended to be defined by the illustrative embodiments but the subject matter which the applicant's regard as their invention is particularly set forth in the following claims.

I claim:

1. A method of preparing a disazo tetracarboxylic acid having the formula:

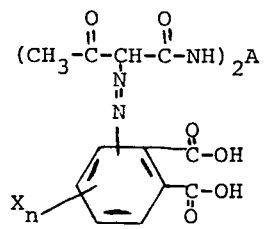

wherein A is aromatic hydrocarbylene or substituted aromatic hydrocarbylene, X is the same or different halogen selected from the class consisting of fluorine, chlorine and bromine, or lower alkyl or lower alkoxy and $n$ is an integer of from 0 to 2, said method comprising the coupling of one molecular proportion of a bis-acetoacetamide having the formula

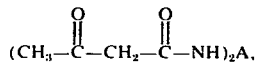

wherein A is as defined above, with two molecular proportions of a diazotized aminophthalic acid having the formula:

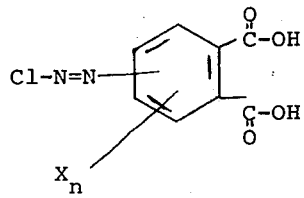

wherein X and $n$ are as defined above, in an aqueous medium containing a sufficient amount of a water soluble cyclic ether to bring the reagents into solution.

2. The method of claim 1 wherein the cyclic ether is selected from the class consisting of tetrahydrofuran, tetrahydropyran, dioxane, and mixtures thereof.

3. The method of claim 1 wherein the amount of cyclic ether is from about 40% to about 60% of the total volume of the reaction mixture.

4. The method of claim 2 wherein the ether is tetrahydrofuran.

5. The method of claim 1 wherein A is a phenylene.

6. The method of claim 1 wherein A is a 2,5-dichlorophenylene.

7. The method of claim 1 wherein $n$ is 0.

8. In a method of preparing a disazo diimide comprising the steps of coupling one mole of a bis-acetoacetamide having the formula:

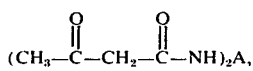

wherein A is aromatic hydrocarbylene or substituted aromatic hydrocarbylene, with two moles of a diazotized aminophthalic acid having the formula:

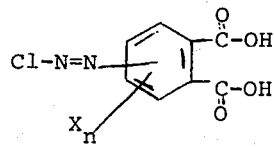

wherein X may be the same or different halogen selected from the class consisting of fluorine, chlorine, and bromine, or lower alkyl, or lower alkoxy and $n$ is an integer from 0 to 2, to produce a disazo tetracarboxylic acid, and reacting said acid or the dianhydride thereof with a primary amine or ammonia, the improvement consisting of coupling the bis-acetoacetamide and diazotized aminophthalic acid in an aqueous medium containing a sufficient amount of a water soluble cyclic ether to bring the coupling reagents into solution.

9. The improved method of claim 8 wherein the cyclic ether is selected from the class consisting of tetrahydrofuran, tetrahydropyran, dioxane and mixtures thereof.

10. The improved method of claim 8 wherein the ether is tetrahydrofuran.

* * * * *

UNITED STATES PATENT AND TRADEMARK OFFICE
CERTIFICATE OF CORRECTION

PATENT NO. : 3,951,943
DATED : April 20, 1976
INVENTOR(S) : Jack L. Towle

It is certified that error appears in the above-identified patent and that said Letters Patent are hereby corrected as shown below:

At column 2, omit lines 63 to 70, starting with "equal volumes of water ... " and ending with "mixed with one mole of"

At column 7, insert the following before line 1:
"equal volumes of water and tetrahydrofuran. The tinctorial strength of the product after the second coupling reaction was much improved and approximately equal to that of the disazo tetracarboxylic acid obtained in one step by the method of this invention.

In an attempt to increase the conversion to the tetra-acid and, thereby, the yield of product, an excess (3 mls.) of diazo phthalic acid was mixed with one mole of"

Signed and Sealed this

Twenty-eighth Day of September 1976

[SEAL]

Attest:

RUTH C. MASON
Attesting Officer

C. MARSHALL DANN
Commissioner of Patents and Trademarks